United States Patent
Clarissou (10) Patent No.: US 9,423,414 B2
(45) Date of Patent: Aug. 23, 2016

(54) METHOD AND SYSTEM FOR MEASURING THE VARIATION IN SPEED OF A MOVING BODY

(75) Inventor: Yves Clarissou, Paris (FR)

(73) Assignee: SIEMENS S.A.S., St. Denis (FR)

( * ) Notice: Subject to any disclaimer, the term of this patent is extended or adjusted under 35 U.S.C. 154(b) by 285 days.

(21) Appl. No.: 14/008,637

(22) PCT Filed: May 30, 2011

(86) PCT No.: PCT/EP2011/058843
§ 371 (c)(1),
(2), (4) Date: Oct. 11, 2013

(87) PCT Pub. No.: WO2012/130338
PCT Pub. Date: Oct. 4, 2012

(65) Prior Publication Data
US 2014/0026663 A1    Jan. 30, 2014

(30) Foreign Application Priority Data

Mar. 30, 2011    (EP) ..................................... 11290158

(51) Int. Cl.
| | | |
|---|---|---|
| G01P 15/02 | (2013.01) | |
| G01P 15/08 | (2006.01) | |
| G01P 15/03 | (2006.01) | |
| B60T 8/172 | (2006.01) | |
| G01P 15/093 | (2006.01) | |
| G01P 15/11 | (2006.01) | |

(52) U.S. Cl.
CPC .............. *G01P 15/032* (2013.01); *B60T 8/172* (2013.01); *G01P 15/036* (2013.01); *G01P 15/093* (2013.01); *G01P 15/11* (2013.01)

(58) Field of Classification Search
CPC ........... G01P 15/0802; G01P 15/0891; G01P 15/032; G01P 15/093; G01P 15/18; G01P 15/11; G01P 15/036
USPC ............................ 73/514.01, 514.36, 514.38
See application file for complete search history.

(56) References Cited

U.S. PATENT DOCUMENTS 2,908,782 A * 10/1959 Kiesel ................ H01H 71/0214
200/296
3,147,391 A   9/1964 Darrel et al.
(Continued)

FOREIGN PATENT DOCUMENTS

CN    1285515 C    11/2006
DE    3347066 A1    7/1985
(Continued)

*Primary Examiner* — Helen Kwok
(74) *Attorney, Agent, or Firm* — Laurence Greenberg; Werner Stemer; Ralph Locher (57) ABSTRACT

A device and method measure an acceleration of a moving body. The device contains a solid body having a moving part and an internal cavity capable of allowing for a free movement of the moving part. The internal cavity has at least one wall forming a sloping track, the sloping track having a surface allowing for the free movement of the moving part on the sloping track between an initial position at rest and a distant position spaced from the initial position situated at an end of the internal cavity and reachable by the moving part during a variation in acceleration. The moving part moving from the initial position to the distant position in the internal cavity under an effect of the acceleration of the moving body. At least one detector is provide and is capable of detecting a presence of the moving part at the distant position.

14 Claims, 2 Drawing Sheets

(56) References Cited

U.S. PATENT DOCUMENTS

| | | | |
|---|---|---|---|
| 3,628,384 A * | 12/1971 | Jones | B60R 21/33 200/61.45 R |
| 3,662,606 A * | 5/1972 | Prachar | B60R 21/33 73/514.01 |
| 3,693,461 A * | 9/1972 | Daffron | B60R 21/33 73/514.01 |
| 4,198,864 A * | 4/1980 | Breed | G01P 15/04 73/492 |
| 4,573,706 A * | 3/1986 | Breed | G01P 15/036 180/282 |
| 4,737,630 A * | 4/1988 | Andersson | G01P 15/093 250/231.1 |
| 4,849,655 A | 7/1989 | Bennett | |
| 5,134,883 A | 8/1992 | Shannon | |
| 5,659,137 A | 8/1997 | Popp | |
| 5,960,376 A * | 9/1999 | Yamakado | B60G 17/01908 318/276 |
| 6,131,456 A * | 10/2000 | Mattes | B60R 21/013 200/61.45 R |
| 7,069,789 B2 * | 7/2006 | Tokunaga | G01C 19/56 73/777 |
| 2014/0123756 A1 * | 5/2014 | Consoli | G01P 15/0802 73/514.36 |

FOREIGN PATENT DOCUMENTS

| | | |
|---|---|---|
| DE | 3915069 A1 | 11/1990 |
| DE | 4114992 C1 | 8/1992 |
| DE | 19602428 A1 | 7/1996 |
| GB | 2211942 A | 7/1989 |

* cited by examiner

METHOD AND SYSTEM FOR MEASURING THE VARIATION IN SPEED OF A MOVING BODY

BACKGROUND OF THE INVENTION

Field of the Invention

The present invention relates to a method and a system for measuring a variation in speed of a moving body as a function of time.

In particular, the present invention relates to the field of vehicles, in particular guided vehicles, requiring safe measurement of their acceleration, such as for example guided vehicles in the field of railways. "Guided vehicle" refers to means of public transport such as buses, trolley buses, trams, metros, trains or train units, etc., for which the safety aspect is very important. Generally, the present invention applies to any moving body (i.e. to any body which moves or is moved, such as for example an automobile) which has to observe at least one acceleration safety criterion. This safety criterion is in particular capable of protecting said moving body during acceleration, for example emergency braking. By acceleration, the present invention refers to positive accelerations (increase in speed as a function of time) and negative accelerations or decelerations (reduction in speed as a function of time) of the moving body.

For many moving bodies, in particular moving bodies providing for the transportation of passengers such as for example manual or automatic metros, running on rails or tyres, it is necessary to determine whether the acceleration, positive or negative, undergone by the moving body is above a predefined threshold or not. For example, in order to ensure the safety of a guided vehicle such as a metro, its acceleration during emergency braking must compulsorily observe several safety criteria simultaneously, including in particular:
- a minimum deceleration value, used as an assumption for calculations of safe stopping distance (typically 1.8 m/s$^2$);
- a maximum deceleration value, beyond which standing passengers on board the vehicle risk falling (typically 3.2 m/s$^2$ according to standard ASCE 21, or 3.5 m/s$^2$ according to standard EN 13452).

Failure to observe the first safety criterion (minimum deceleration value) is an event of severity I considered "catastrophic" in the sense of standard EN-50126. Failure to observe the second safety criterion (maximum deceleration value) is an event of severity II considered "critical" or III considered "marginal" in the sense of standard EN-50126. Another safety criterion is a rapid variation in the deceleration of said moving body during emergency braking. In fact, a jerk of the order of 3 to 6 m/s$^3$ must be observed during emergency braking in order to ensure the safety of said moving body. This jerk implies a method and a device for measuring the variation in the speed of the moving body characterized by a short response time.

Numerous methods and devices for measuring the acceleration of a moving body are known to the person skilled in the art. Some decelerometers use for example a tube filled with mercury to measure the deceleration of the moving body. Thus, GB 2 211 942 A describes a device capable of measuring an acceleration on the basis of an electrical or optical measurement of a movement of a fluid, in particular mercury, contained inside a sealed U-shaped or O-shaped tube. Unfortunately, said tube is fragile, easily damaged and therefore liable to release said fluid, which might in particular be found to be harmful in the case of mercury. Also, such decelerometers can generally only indicate the variation in speed of the moving body as a function of time for a single direction of movement of said moving body. Each direction of movement of the moving body must then be associated with its own device for measuring acceleration. In particular in the case of guided vehicles characterized by two directions of movement, respectively forward movement and reverse movement, two decelerometers are needed in order to cover the measurement of acceleration in said two directions of movement.

Another device for measuring acceleration is described in U.S. Pat. No. 4,849,655. This is a device made up of two elements, a first fixed element and a second element with relative movement with respect to said first element. These two elements are for example respectively a magnetic field emitter and a Hall effect sensor. During acceleration, the relative movement between the two elements produces a variation in the magnetic field, which is detected by the sensor. The latter then produces a signal correlated with the variation in speed of the moving body. This signal is in particular used to monitor braking of said moving body.

Other devices are in particular based on detection and measurement of acceleration by means of a sensor which changes voltage as a function of its direction of rotation (U.S. Pat. No. 5,659,137), on an angular accelerator using mercury as an inertial mass (U.S. Pat. No. 3,147,391) and on measurement of movement of one part of a pendulum immersed in a liquid (U.S. Pat. No. 5,134,883). Unfortunately, their operating principles are generally complex, requiring for example signal analysis, and also implying high production cost. Furthermore, these devices are not reliable over long operating periods, being subject to wear, in particular mechanical wear, of their component parts and parts involved in the measurement of acceleration.

BRIEF SUMMARY OF THE INVENTION

An object of the present invention is to propose a method and a device for measuring variation in the speed of a moving body as a function of time which are simple, economically advantageous, safe, reliable, and capable of rapidly establishing said measurement of said variation (i.e. having a short response time, in particular of the order of 100 to 200 ms).

Another object of the present invention is in particular to provide for reliable determination of when a predefined limit acceleration threshold is exceeded by the moving body, independently of processing of a signal which can be correlated with measurement or determination of said acceleration.

With these objects, a method and a device are proposed by the content of the independent claims. A set of sub-claims also presents advantages of the invention.

The present invention proposes a device for measuring an acceleration of a moving body, said device comprising:
- a solid body comprising an internal cavity, in particular delimited by one or more walls belonging to said solid body, said cavity being in particular closable or sealable and capable of allowing for the free movement of a moving part;
- said internal cavity at least one of said walls of which is capable of forming a sloping track with respect to the horizontal, and one surface of which allows for said free movement, for example rectilinear or curvilinear, of said moving part on said track in said internal cavity between an initial position at rest and a position distant from said initial position, situated at an end of the internal cavity and in particular reachable by said part during a variation in acceleration, for example when the acceleration of said moving body is not zero and greater than a threshold value, as soon as said device is coupled with said moving body. In particular, when said moving body is resting flat on a horizontal plane and said device according to the invention is coupled with said moving body in order to measure its acceleration during a movement of said moving body, said initial position is capable of being occupied by said moving part when the absolute value of the acceleration of the moving body is below a minimum value, while the distant position, situated at an end of said cavity is reachable by said part solely when the acceleration of said moving body is not zero, and in particular when the sign of the acceleration is opposite to the sign of a mean slope of the track (i.e. to the positive or negative algebraic symbol characterizing the mean value of the slope) and the absolute value of the acceleration exceeds a maximum threshold acceleration value. In particular, said moving part is a circular body, in particular cylindrical or spherical in shape such as for example a hollow or solid cylinder or ball capable of moving by rotation on said track;

said moving part, capable of moving inside said solid body, in said internal cavity, under the effect of the acceleration of said moving body, in particular along a rectilinear or curvilinear trajectory, from said initial position to said distant position, the potential energy of said part at said distant position being in particular greater than the potential energy of said part at said position at rest when said measuring device is coupled with said moving body at rest on a horizontal plane;

at least one detector capable of detecting a presence of said part at said distant position.

The present invention also proposes a method for measuring an acceleration of a moving body characterized in that it comprises:

during an acceleration of said moving body, a movement, in a closed cavity, of a moving part, in particular a circular body cylindrical or spherical in shape such as a hollow or solid ball or cylinder, from an initial position at rest to a distant position, said moving part being capable of moving freely in particular by rotation, from an initial position at rest to a position distant from said initial position, at an end of said cavity, said initial and distant positions being linked by a continuous track, in particular sloping with respect to the horizontal, and formed by a wall of said cavity and capable of allowing for said movement of said part between said two positions on said track. In particular, said part is capable of performing either a rectilinear movement on a plane inclined by an angle θ with respect to the horizontal forming said track (track in the form of an inclined plane), or a curvilinear movement on a convex track, in particular the absolute value of the slope of which decreases from the initial position to the distant position. Furthermore, the potential energy of said part at said distant position is in particular greater than the potential energy of said part at said position at rest;

a detection by means of a detector of a presence of said part at said distant position.

Track refers in particular in the present invention to a surface generated by a continuous movement (for example between said initial position and said distant position) from one end of a segment of a straight line in a plane perpendicular to said segment, comprising said initial position and said distant position. Preferably, said track is a surface defined by a segment of a flat curve or a flat closed curve (for example a circle) one point of which passes through a variable point describing a straight line or a curve including said initial position and said distant position. In other words, said track is preferably generated by a movement of said segment of flat curve or of said flat closed curve along a flat rectilinear or curvilinear path linking said initial position and said distant position.

For example, said track is a strip with rectilinear or concave (bowl-shaped) cross-section and curvilinear or rectilinear longitudinal section, said strip being enclosed inside said cavity and forming a wall of it. Preferably, at least one surface of the track and at least one surface of said part, said surfaces being capable of coming into contact with one another, are characterized by a geometry and a material guaranteeing low friction between said track and said part. For example, if said part moves by sliding on said track, then the surface of said part and the surface of said track comprise respectively a first and a second material which, when they are in contact with one another, are characterized by a low coefficient of friction and high resistance to wear. This involves for example tungsten carbide for said part and steel for said track. Other pairs of materials with low coefficient of friction are clearly known to a person skilled in the art.

According to the present invention, said solid body comprises in particular a central part comprising an opening intended to form at least one part of said cavity. Advantageously, said central part is in particular of a thickness equal to or greater than a width of said part, for example the diameter of the ball or a height of said cylinder, and is capable of including in particular said track. Also, said central part is capable of being sandwiched, in particular in a sealed manner, between two lateral parts. Also, said cavity, thus formed by partitioning said central part with said lateral parts, can be subjected to a vacuum or filled with a particular gas. Said particular gas is for example nitrogen capable of preventing any oxidation of the part or the cavity and guaranteeing low humidity in said cavity. Clearly, said internal cavity of said solid body can be created according to other methods and arrangements known to a person skilled in the art, such as for example by machining, drilling, and/or in particular using a single lateral part in order to seal said cavity, or by drilling a track-channel with a circular section in a one-piece body, said channel being able subsequently to be plugged at the ends.

According to the present invention, said lateral parts are capable of being arranged respectively on each side of the central part and of partitioning said opening in order to form said cavity according to the invention by partitioning said opening. Advantageously, said partitioning may be sealed. Also, at least one of the lateral parts is at least capable of cooperating with said detector in order for example to act as a support for it and/or to provide for said detection. In particular, the detector can be positioned opposite said distant position. This is for example an inductive sensor capable of detecting said part comprising in this case at least one metal part, or an optical sensor capable of detecting said part which is, in this other case, opaque. In all cases, the material of said lateral part is matched to the type of detection performed by said detector: transparent material for optical detection of the presence of said part, or non-conducting material when using a metal detector and a part made at least in part of metal.

In particular, said solid body of said device according to the invention is also capable of being coupled with said moving body and cooperating with a braking system of said moving body. In fact, the detector according to the invention is in particular capable for example of signaling to said braking system the presence of said part at said distant position. Advantageously, said solid body of the device can be integrated with a horizontal part of the moving body. Advantageously, said detector according to the invention is thus capable of transmitting to the braking system a signal relating to the detection of the presence of said part at said distant position.

According to a first embodiment of the present invention, said track is in particular a flat surface intended to form a plane inclined at an angle θ with respect to the horizontal when said solid body is coupled with said moving body, the latter being at rest on a horizontal plane. If the solid body of the device is integrated with a horizontal part of said moving body, then said track forms an angle θ with respect to said horizontal part of the moving body, for example, its floor. Advantageously, said cavity may be perceptibly parallelepiped in shape, one of the faces of the parallelepiped then forming said inclined plane, i.e. said track.

According to a second particular embodiment, said track is a strip describing a curvilinear trajectory. Advantageously, said track can then be a convex track the slope of which decreases from the initial position to the distant position.

In order to detect a positive and negative acceleration of said moving body, two identical devices according to the invention, respectively a first and a second device, can be integrated symmetrically end-to-end or integrated side-by-side, so that the first device is capable of measuring a positive acceleration and the second device a negative acceleration. In fact, when said moving body is resting flat on a horizontal plane and said devices are coupled with said moving body in order to measure its acceleration during a movement of said moving body in one direction, the value of the slope of the track of the first device at a point of said track of the first device will be the opposite of the value of the slope of the track of the second device at a point symmetrical to said point of the first device, as soon as said slopes do not have a zero value. Then, a negative acceleration of said moving body will be capable of being measured by the device whose track has a positive slope and a positive acceleration will be capable of being measured by the device whose track has a negative slope, the sign of the slope of a track being preferably either positive or negative. The detection of positive and negative accelerations of said moving body may also be performed by said device, in particular according to a third embodiment.

According to its third particular embodiment, said solid body comprises in particular another cavity delimited by one or more of its walls, said other cavity being symmetrical with said cavity and communicating with it so as to allow free movement of said part from one cavity to the other. In particular, said other cavity comprises another track capable of forming with said track of said cavity a continuous path between said distant position at an end of said cavity and another distant position situated at an end of the other cavity. Owing to the symmetry, said initial position is then situated at an equal distance from said distant position and said other distant position, i.e. at an equal distance from the ends of each of the cavities. In particular, said other track is another plane inclined at an angle π-θ (i.e. an angle equal and opposite to θ) with respect to the horizontal when said solid body is coupled with said moving body at rest on a horizontal plane, so that said inclined plane and said other inclined plane perceptibly form a dihedron characterized by a dihedral angle equal to π-2θ, the intersection of the two planes corresponding to said initial position and the end, in particular closed, of said other cavity corresponding to said other distant position reachable by said part when the acceleration of said moving body is not zero and the sign of the acceleration is opposite to the sign of a mean slope of the other track and the absolute value of the acceleration exceeds a maximum threshold acceleration value, said other distant position also being symmetrical with said distant position and said part being able to move freely under the effect of the acceleration of said moving body, in particular in a rectilinear manner, from said initial position to one or other of said distant positions as a function of the positive or negative sign of the acceleration of the moving body.

Whatever the embodiment of the present invention, one or more detectors can be placed along the track in order to detect respectively one or more levels of acceleration. Also, at least one of said initial or distant positions comprises in particular a magnet capable of cooperating with at least one metal part of said part in order to stabilize said part at said position by magnetization of the part at said position. Said magnet may advantageously be embedded in said solid body in the vicinity of said position. Also, at least one of said initial or distant positions may in particular be fitted with a buffer, for example made from an absorbent material, capable of absorbing a shock effect between said part and the end of the cavity and/or of the other cavity.

According to the present invention, the potential energy likely to be acquired by said moving part when it is at said distant position or at said other distant position is preferably greater than the potential energy likely to be acquired by said part when it is at said initial position, when the device according to the invention is mounted or fixed to said moving body at rest on a horizontal plane. In other words, the positioning in said solid body of said initial position and said distant position or said other distant position is preferably characterized in that, when the device according to the invention is mounted or fixed to said moving body at rest on a horizontal plane, the potential energy of said moving part at said distant position or at said other distant position is greater than the potential energy of said piece at said initial position.

Examples of embodiments and applications provided using the following figures will help to give a better understanding of the present invention. The reference numbers used in one figure are also used coherently in the other figures.

DESCRIPTION OF THE INVENTION

Figure 1:
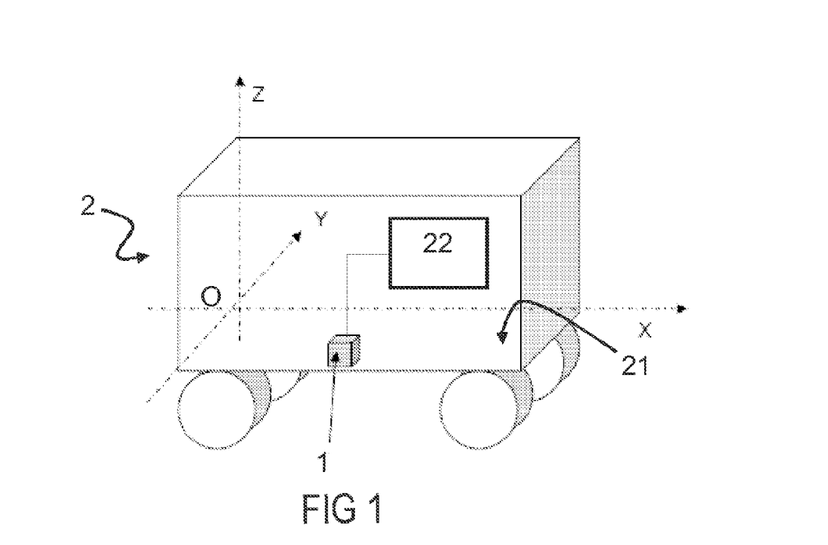
FIG. 1 exemplary embodiment according to the invention of a device for measuring acceleration coupled with a vehicle.

As an example, FIG. 1 shows a device 1 for measuring the acceleration of a moving body according to the invention, said moving body being in particular a vehicle 2 with which the device 1 is coupled. Said device 1 may in particular be fixed to a horizontal floor 21 of said vehicle 2 and be connected to a braking system 22 of said vehicle. Advantageously, it makes it possible rapidly, safely and reliably to identify when a maximum threshold value, in particular predefined, for the acceleration of said vehicle is exceeded, whether it be a railway vehicle or a metro/tram running on iron wheels or tyres, and to limit said acceleration by transmitting a signal capable of informing the braking system 22 of said excess. Said signal may for example be transmitted either directly in the vehicle's pneumatic, hydraulic or electrical networks, either to a central braking control unit, or to a general vehicle control unit, such as for example an automatic train control unit.

An orthonormal reference system (O, x, y, z) as presented in FIG. 1 will be used in the rest of the description in order to help the reader to understand the present invention. This orthonormal reference system is a conventional reference system making it possible to position said device 1 with respect to the vehicle. This reference system comprises a longitudinal axis (Ox) parallel to a direction of movement of the vehicle (for example parallel to rails providing guidance of said vehicle), a transverse axis (Oy) perpendicular to the longitudinal axis (Ox) and a vertical axis (Oz) perpendicular to the plane formed by the longitudinal axis (Ox) and the transverse axis (Oy). The vertical axis (Oz) is in particular perpendicular to the floor of the vehicle 2. It is also perpendicular to the ground on which the vehicle is capable of moving when said ground is a flat horizontal surface, without camber.

Figure 2A:
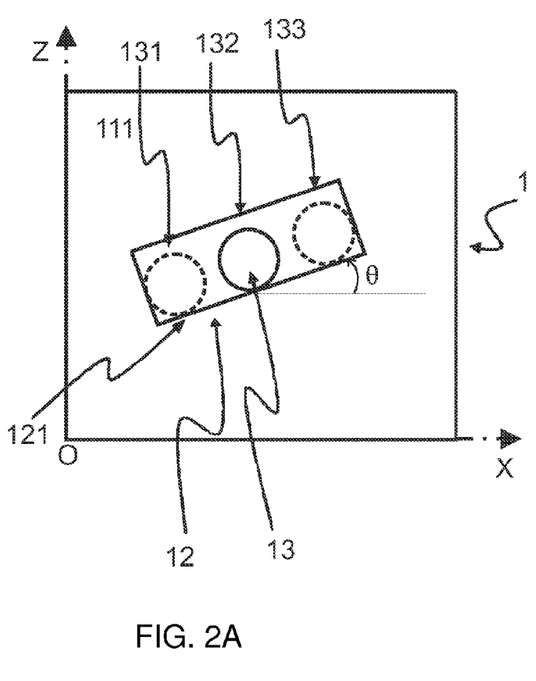
FIG. 2A is an exemplary embodiment according to the invention of a device for measuring the acceleration of a moving body.
Figure 2B:
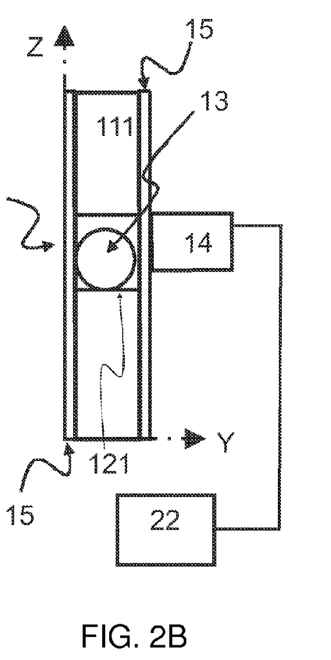
FIG. 2B is a side view of the device for measuring the acceleration of the moving body.

FIG. 2 presents a cross-section A and a cross-section B of an exemplary embodiment according to the invention of a device 1 for measuring the acceleration of a moving body which can be fitted to said moving body as presented in FIG. 1, said device being in particular capable of signaling that said acceleration has exceeded a predefined acceleration threshold value, said device comprising:

a solid body comprising an internal cavity 12;
said cavity 12 at least one wall of which is capable of forming a track 121 the surface of which allows for a free movement of a moving part 13, in particular a ball, on said track 121 in said cavity 12 between an initial position 131 at rest and a position 133 distant from said initial position, said distant position being situated at an end of the cavity. Advantageously, said track 121 is in particular a flat surface intended to form a plane inclined at an angle θ with respect to the horizontal, such that the track is characterized by a constant positive slope. Also, said initial position 131 is in particular capable of being occupied by said part 13 when the absolute value of the acceleration of the moving body is below a minimum positive threshold value, while the distant position 133, situated at an end of said cavity is reachable by said piece 13 under the effect of the acceleration of said moving body when the acceleration of said moving body is not zero and the sign of the acceleration is opposite to the sign of the slope of the track and the absolute value of the acceleration exceeds a maximum positive threshold value. For an acceleration of said moving body between the minimum threshold value and said maximum threshold value, the geometry of said track enables said part 13 to be positioned at an intermediate position 132 between the initial 131 and distant 133 positions;

said ball 13, capable of moving freely under the effect of the acceleration of the moving body along a rectilinear trajectory on the inclined plane in said cavity from said initial position 131 to said distant position 133 and vice versa;

at least one detector 14 capable of detecting a presence of said ball 13 at said distant position 133 and cooperating with a braking system 22 of said moving body, for example by providing information relating to said presence in the form of an electrical signal which can in particular be transmitted to said braking system 22 capable of controlling and actuating the braking of said moving body. In particular, several types of detectors may be envisioned to detect the presence of the part, whether it be said ball 13 or a moving cylinder. This involves for example detection by a metal proximity sensor of the inductive type or optical detection comprising in particular an emitter and a receiver situated transversely on each side of the cavity, for example opposite said initial 131 and/or distant 133 position.

Said solid body is in particular made from at least one easily machinable hard material (metal, ceramic or hard plastic) and may comprise a fixing means capable of fixing said solid body rigidly to a chassis or in a housing of the moving body so that said inclined plane is inclined by said angle θ with respect to the horizontal when the moving body is on a horizontal plane. In particular, said solid body comprises a means of inclination (for example, with a screw or spring) enabling said θ to be varied with respect to the horizontal when the moving body is on a horizontal plane in order to vary said threshold acceleration value. Preferably, said part 13 is made of metal (steel or stainless steel). Said solid body may in particular comprise a central part 111 comprising at least a part of said cavity 12, and two lateral parts 15 which may in particular be situated on each side of said central part 111 in order to form said cavity 12 sealed to said central part 111 and in order to hold said moving part 13 transversely (i.e. to ensure it is held transverse along y).

The detector 14 according to the invention is preferably an inductive sensor capable of reacting to an electrically conducting metal nature of part 13, or an optical sensor capable of reacting to an opaque nature of said part. For this purpose, at least one of said lateral parts 15, in particular the lateral part capable of acting as a support for said sensor comprises a zone which is transparent to signals used by the detector 14 to detect said part 13. This may involve an optically transparent zone providing for the optical detection of said part 13 or a zone formed from a non-conducting material in the case of detection by induction.

As is known, during a movement of said moving body on a flat path without camber, the acceleration of said part 13 along the vertical axis (Oz) is the acceleration of gravity g and the acceleration a along the longitudinal axis (Ox) is the second derivative of the movement x(t) of said moving body such that $a = d^2x/dt^2$. The initial position 131 at rest of said moving part 13 is the position occupied by said part 13 when said moving body is in positive acceleration along the longitudinal axis (Ox), when said moving body is at rest or has a constant speed, and when the moving body has a moderate negative acceleration (or deceleration) below a minimum positive threshold value of acceleration, for example g·tan(θ), θ being in this case within the range of [0, π/2]. The distant position 133 of said part 13 is the position occupied by said part 13 when the moving body is in negative acceleration or deceleration such that said deceleration exceeds a maximum threshold value of acceleration, for example when the deceleration is greater than g·tan(θ), θ being in this case within the range of [0, π/2].

If the moving body moves on a sloping path characterized by a value p for the angle of slope, a change in reference consisting of a rotation of angle p about the axis (Oy) makes it possible to determine that the acceleration of said part 13 along the axis (Oz) is equal to g·cos(p), which is close to g for slight slopes p (approximation of small angles), and the acceleration along the axis (Ox) is equal to $a=d^2x/dt^2+g·\sin(p)$. Since this latter acceleration also affects the device according to the invention as well as the passengers in said moving body, no slope correction is needed in order to correct any influence of the slope on said device according to the invention. Thus, the device according to the invention is capable of operating in the same way, whether said moving body is moving on a horizontal plane or on a sloping path, for example on an inclined plane.

Also, the influence of the camber of a path on which said moving body comprising said device according to the invention might move can be evaluated. In fact, on a path with camber characterized by a value d for the angle of camber, a change in reference consisting of a rotation of angle d about the axis X makes it possible easily to calculate the acceleration experienced by said part 13. In fact, in this case, the acceleration experienced along (Oz) is equal to g·cos(d), the value of which is close to g for small angles of camber d. The acceleration experienced by the part 13 along the axis (Ox) is unchanged $a=d^2x/dt^2$. Thus, the device according to the invention is capable of operating in the same way whether said moving body is accelerating on a path either with or without camber.

Figure 3:
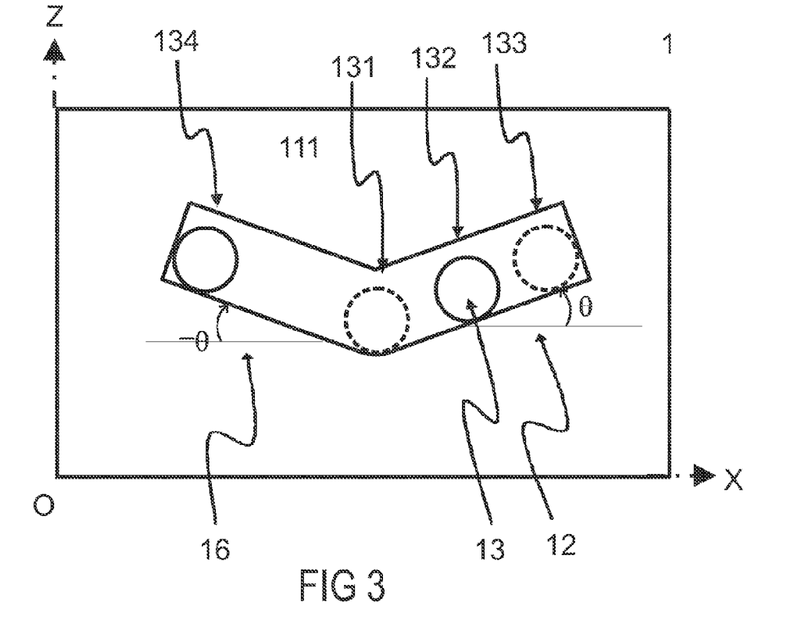
FIG. 3 exemplary embodiment according to the invention of a device for measuring the acceleration of a moving body according to another embodiment.

FIG. 3 presents a cross-section of the device according to the invention according to another embodiment corresponding to said third embodiment mentioned above. In fact, according to this other embodiment, said solid body of the device 1 comprises in particular another cavity 16 symmetrically identical to said cavity 12, communicating with the latter and comprising another track capable of forming with said track of said cavity 12 a continuous path between said distant position 133 situated at an end of said cavity 12 and another distant position 134 situated at an end of the other cavity 16, said other distant position 134 and said distant position 133 each being able to be fitted with a detector according to the invention. Owing to the symmetry, said initial position 131 is then midway between said ends. In particular, said other track is another plane inclined by an angle π-θ (i.e. an angle equal and opposite to θ) with respect to the horizontal when said solid body is coupled with said moving body at rest on a horizontal plane, such that said inclined plane and said other inclined plane form a dihedron characterized by a dihedral angle equal to π-2θ. In particular, each of the cavities 16 and 12 may be hollowed out or machined in a central part 111 of the solid body of the device 1, and lateral parts may laterally close or partition said cavity and said other cavity in order to form a closed enclosure formed from the two cavities, capable of containing said moving part 13 and allowing it to move from one to the other of the cavities. The moving part 13 can in particular be either a ball or a cylinder (solid or hollow).

The device according to the invention described in FIG. 3 is thus capable of measuring when a maximum threshold value for positive acceleration and deceleration is exceeded. It therefore involves a bidirectional system capable of monitoring the acceleration of vehicles which may in particular be reversible, such as railway vehicles, metros and trams. According to this preferred embodiment of the device described in FIG. 3, the initial position 131 at rest of said moving part 13 is the position occupied by said part 13 when said moving body is in moderate acceleration (positive or negative) along the longitudinal axis (Ox) with an absolute value below a minimum positive threshold value, for example equal to the absolute value of g·tan(θ), or when said moving body is at rest or has a constant speed. The distant position 133 of said part 13 is the position occupied by said part 13 when the moving body is in negative acceleration, or deceleration, and said deceleration has an absolute value exceeding a maximum threshold value for positive acceleration (or a maximum absolute acceleration value), for example when the deceleration is greater than the absolute value of g·tan(θ). The other distant position 134 of said part 13 is symmetrically arranged with respect to said distant position 133 (axis of symmetry passing through the initial position 131 and perpendicular to the horizontal) and is the position occupied by said part 13 when the moving body is in positive acceleration, and said positive acceleration exceeds another maximum threshold value for positive acceleration, for example when the positive acceleration of said moving body is greater than the absolute value of g·tan(θ). Each of the positions 131, 133, 134, i.e. whether the initial position 131, the distant position 133 or the other distant position 134, may advantageously be fitted with a detector capable of detecting the presence of said part 13.

Advantageously, the device according to the invention, whatever the embodiment of it, is in particular capable of comprising means of stabilization of said part 13 at at least one position on said track in said cavity 12 and/or in said other cavity 16. These means of stabilization make it possible to prevent erratic movements of the part 13, in particular when a deceleration is close to the maximum threshold value. Preferably, a magnet capable of being embedded in said solid body in the vicinity of the initial position 131, and/or the distant position 133 and/or the other distant position 134, makes it possible to stabilize said part 13 at said initial position 131, and/or at the distant position 133, and/or at the other distant position 134, by exerting on said part 13 a force of attraction. In this case, a movement of said part 13 away from the initial position 131 (or similarly from said distant positions 133, 134) requires additional acceleration da with respect to the maximum threshold value g·tan(θ) in order to be able to overcome the force of attraction exerted by the magnet.

Another preferred means of stabilization according to the invention consists in using a track with a convex shape, the slope of which decreases when the part 13 advances from the initial position 131 to the distant position 133, and in the particular case of FIG. 3 where another cavity 16 communicates with said cavity 12, the absolute value of the slope decreases when the part 13 advances from the initial position 131 to the other distant position 134.

Each of said means of stabilization mentioned above introduces a hysteresis effect into the behavior of the device according to the invention in that a movement of said part 13 from the initial position 131 to the distant position 133 requires a deceleration greater than a+da, and in that a movement of said part 13 from said distant position 133 to said initial position 131 requires a deceleration a−da.

Preferably, at least one of said initial 131 or distant 133 or 134 positions comprises a damping system for said part 13 in order to prevent any shocks between said part 13 and a wall of the solid body, in particular with the end of one or the other of the cavities. For example, a buffer made from an absorbent material such as rubber may be arranged at at least one end of said cavity and/or of said other cavity.

The device according to the invention can in particular be integrated with said moving body by means of integration devices (for example a system of screws or latches) capable of integrating the solid body of the device according to the invention with the moving body, for example with the floor of a vehicle. Said means of integration preferably provide for fine adjustment of the maximum and minimum threshold acceleration values through adjustment of an angle of positioning of the device with respect to the moving body, for example with respect to the floor of the vehicle.

Preferably, said part 13 is a steel ball with a diameter equal to or smaller than a distance D separating the initial position from the distant position on the track, a maximum threshold value for deceleration is fixed and selected as equal to $a_0=2.2$ m/s$^2$, and a slope of said inclined plane is defined by $\tan(\theta)=2.2/9.81=0.224$. Assuming that the deceleration, initially low, varies over time according to a constant jerk J, it follows that the acceleration a (i.e. the instantaneous deceleration) of the moving body is in this case given by $a=a_0+J\cdot t$. As soon as the acceleration a exceeds the maximum threshold value $a_0=2.2$ m/s$^2$, Newton's laws of motion applied to the ball imply:

$$F=M\cdot[a\cdot\cos(\theta)-g\cdot\sin(\theta)]=(M+I)\cdot d^2s/dt^2$$

where
F is a force
t is time
M is the mass of the ball
I is the mass equivalent to the roll inertia of the ball equal to $2/5\cdot M$
s is the x-axis of the ball along the track The equation of movement of the ball along the track then becomes:

$$d^2s/dt^2=5/7\cdot[a\cdot\cos(\theta)-g\cdot\sin(\theta)]$$

Also considering that, at instant t=0, $a_0=g\cdot\tan(\theta)$, the equation of movement becomes:

$$d^2s/dt^2=5/7\cdot J\cdot\cos(\theta)\cdot t$$

Estimating jerk values equal to 3 m/s$^3$ and 6 m/s$^3$, a first flat track with constant slope and a second convex track with the slope changing linearly from $\tan(\theta)=0.224$ to $\tan(\theta)=0.184$ giving rise to hysteresis of $\pm 0.2$ m/s$^2$, and considering two values for distance D, respectively equal to 5 mm and 10 mm, the present invention makes it possible to obtain the following results:

| Data | | | Results | |
|---|---|---|---|---|
| J [m/s$^3$] | hysteresis [m/s$^2$] | distance [m] | Response time [s] | Deceleration upon detection [m/s$^2$] |
| 3 | 0 | 0.005 | 0.24 | 2.72 |
| 6 | 0 | 0.005 | 0.19 | 3.14 |
| 3 | 0.2 | 0.005 | 0.23 | 2.89 |
| 6 | 0.2 | 0.005 | 0.19 | 3.34 |
| 3 | 0 | 0.01 | 0.31 | 2.93 |
| 6 | 0 | 0.01 | 0.24 | 3.44 |
| 3 | 0.2 | 0.01 | 0.29 | 3.07 |
| 6 | 0.2 | 0.01 | 0.24 | 3.64 |

This table then leads to the conclusion that measurement of when a threshold value for deceleration is exceeded will be most effective for a small distance D, for example 5 mm, and for a rectilinear track in an inclined plane, without hysteresis.

Thus, the present invention makes it possible to identify and signal when a level of longitudinal acceleration of a moving body is exceeded in a simple way, avoiding any use of an electronic analysis system likely to break down, thus increasing the reliability of measurement of said excess.

Figure 4A:
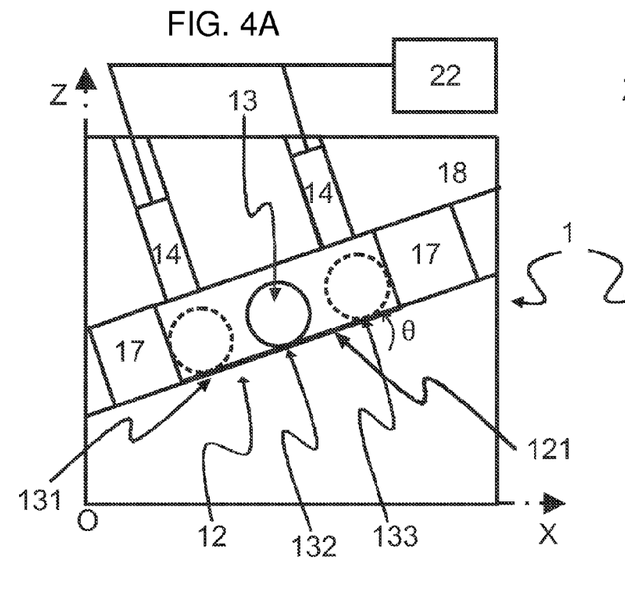
FIG. 4A is an exemplary embodiment according to the invention of a device for measuring the acceleration of a moving body comprising a one-piece solid body.
Figure 4B:
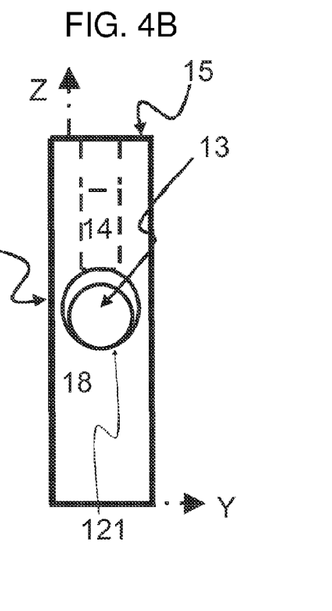
FIG. 4B is a side view of the device for measuring the acceleration of a moving body comprising a one-piece solid body.

Finally, FIG. 4 presents another particular embodiment of the device according to the invention which uses the same references and the same layout as proposed for FIG. 2, presenting a cross-section A and a cross-section B, but with the difference that solid body 18 is a one-piece body, for example a one-piece Plexiglas body, in which said cavity 12 has a cylindrical shape obtained by drilling said solid body 18 and each of the ends of which can be closed by screwing on a plug 17 which may or may not comprise a buffer intended to absorb any shock of the ball 13 against said plug 17. In particular, at least one other drilling in said solid body 18, in particular perpendicular to a generating line of said hollow cylinder, makes it possible to place inside said solid body 18, at least one detector 14 capable of detecting a presence of said ball 13 at least at said distant position 133 and/or at said initial position 131. Preferably, each detector 14 is capable of cooperating with a braking system 22 of said moving body and is preferably centered on the position of said ball 13 at said initial position 131 and at said distant position 133.

Advantageously, the circular section of the cylindrical cavity 12 makes it possible to guarantee a stability of movement of the ball 13 in said cavity 12. The track 121 created by said cavity 12 is thus a surface defined by a closed circular flat curve, i.e. the circle defined by said circular section, a point of which passes through a variable point describing a straight line passing through said initial position 131 and said distant position 133. Said track 121 is thus, according to this other preferred embodiment, a concave surface characterized by a constant positive slope between said initial position 131 and said distant position 133. In particular, the cylindrical cavity 12 is characterized by a diameter greater than the diameter of said ball 13 in order to provide for the free movement of the ball 13 in said cavity.

As for FIG. 2, said initial position 131 is in particular capable of being occupied by said part 13 when the absolute value for the acceleration of the moving body is below a minimum positive threshold value, while the distant position 133, situated at an end of said cavity is reachable by said part 13 under the effect of the acceleration of said moving body when the acceleration of said moving body is not zero and the sign of the acceleration is opposite to the sign of the slope of the track and the absolute value for acceleration exceeds a maximum positive threshold value for acceleration. For an acceleration of said moving body between the minimum threshold value and said maximum threshold value, the geometry of said track allows said part 13 to be positioned at an intermediate position 132 between the initial 131 and distant 133 positions.

To summarize, the device and the method according to the invention present several advantages with respect to the existing devices and methods for measuring an acceleration in that:

they avoid the harmful effects of friction and wear by providing for a selection of hard materials for said part 13 and the track (for example, steel ball capable of rolling on a steel or ceramic track);

the harmful effects of corrosion are avoided by the sealed construction and by the selection of materials. If necessary, in order to avoid any internal oxidation, an inert gas (for example nitrogen or argon) can be introduced during assembly instead of air;

they are reliable and durable in that the device comprises a single moving element, said part 13, which is very simple and protected against external aggressions, being situated in said sealed cavity;

they also provide for a guarantee of the detection of the presence of said part 13, in particular by homogeneous redundancy (for example, two sensors are situated transversely on each side of the distant position of the part 13), or by heterogeneous redundancy (for example one sensor is capable of detecting the presence of said part 13 at each initial or distant position, or by monitoring coherence with a movement of the moving body, by verifying in particular that said part is detected at the initial position (or respectively, is not detected at the distant position) during each immobilization of the moving body;

they have intrinsic safety, since they are based on phenomena of acceleration and inertia;

they guarantee accurate and reproducible measurements of when a threshold acceleration value for said moving body is exceeded: the accuracy and reproducibility of behavior are determined by the geometry of the device according to the invention (moving part and track), which is invariable in the temperature range envisioned (−40° C. to +70° C.);

the device according to the invention is insensitive to the vibrations specified by standard IEC-61373 (table 1) along the axes (Ox), (Oy), (Oz);

they make it possible to control a reaction time needed to measure when a threshold acceleration value is exceeded by adjusting a position of the detector with respect to said track. In fact, the speed of reaction is determined by the distance to be covered between the two extreme positions (initial and distant) on the track. This distance can be reduced as far as the limits of resolution permitted by the spatial resolution of the detector of presence of said part. Typically, a distance equal to once the diameter of a ball selected as part 13 is sufficient to provide for effective detection.

The invention claimed is:

1. A device for measuring an acceleration of a moving body, the device comprising:
    a solid body having a moving part and an internal cavity capable of allowing for a free movement of said moving part, said solid body having two lateral parts and a central part, said central part having an opening formed therein that forms at least one part of said internal cavity, said central part being sandwiched between said two lateral parts;
    said internal cavity having at least one wall capable of forming a sloping track, said sloping track having a surface allowing for the free movement of said moving part on said sloping track in said internal cavity between an initial position at rest and a distant position spaced from the initial position situated at an end of said internal cavity and reachable by said moving part during a variation in acceleration;
    said moving part capable of moving from the initial position to the distant position in said internal cavity under an effect of the acceleration of the moving body; and
    at least one detector capable of detecting a presence of said moving part at the distant position.

2. The device according to claim 1, wherein said central part contains said sloping track.

3. The device according to claim 1, wherein said detector can be positioned opposite the distant position.

4. The device according to claim 1, wherein said detector is an inductive sensor and said moving part contains at least one metal part.

5. The device according to claim 1, wherein said said detector is an optical sensor and said moving part is opaque.

6. The device according to claim 1, wherein said solid body is capable of being coupled to the moving body and said detector to cooperate with a braking system of the moving body.

7. The device according to claim 1, wherein said sloping track is a flat surface forming a plane inclined at an angle θ with respect to horizontal when said solid body is coupled to the moving body at rest on a horizontal plane.

8. The device according to claim 1, wherein said internal cavity is perceptibly parallelepiped in shape.

9. The device according to claim 1, wherein said sloping track is a strip describing a curvilinear trajectory.

10. The device according to claim 1, wherein said solid body contains a further cavity symmetrical with said internal cavity and communicating with said internal cavity, said further cavity having a further track capable of forming with said sloping track of said internal cavity a continuous path between the distant position situated at an end of said internal cavity and a further distant position situated at an end of said further cavity.

11. The device according to claim 10, wherein:
    said moving part has at least one metal part; and
    at least one of the initial position, the distant position or the further distant position has a magnet capable of cooperating with said least one metal part of said moving part in order to stabilize said moving part there.

12. The device according to claim 11, wherein at least one of the initial position, the distant position or the further distant position is fitted with a buffer capable of absorbing a shock effect between said moving part and a wall of said solid body.

13. A method for measuring an acceleration of a moving body, which comprises the steps of:
    during an acceleration of the moving body, a movement occurs, in a closed cavity, of a moving part from an initial position at rest to a distant position, the moving part being capable of moving freely from the initial position at rest to the distant position from the initial position, the initial and distant positions being linked by a sloping, continuous track formed by a wall of the closed cavity and capable of allowing for the movement of the moving part between the initial position and the distant position on the sloping, continuous track, a solid body including the closed cavity having two lateral parts and a central part sandwiched between the two lateral parts, the central part having an opening formed therein that forms at least one part of the closed cavity; and
    detecting, via a detector, a presence of the moving part at the distant position.

14. The method for measuring the acceleration of the moving body according to claim 13, which further comprises transmitting, via the detector, to a braking system a signal relating to a detection of the presence of the moving part at the distant position.

* * * * *